(12) United States Patent
Kinjo et al.

(10) Patent No.: US 6,701,452 B1
(45) Date of Patent: Mar. 2, 2004

(54) DISK ARRAY CONTROLLER HAVING DISTRIBUTED PARITY GENERATION FUNCTION

(75) Inventors: Morishige Kinjo, Tama (JP); Kyoichi Sasamoto, Tama (JP); Masao Sakitani, Tachikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 526 days.

(21) Appl. No.: 09/628,302

(22) Filed: Jul. 28, 2000

(30) Foreign Application Priority Data

Jul. 30, 1999 (JP) .......................... 11-217146

(51) Int. Cl.⁷ .......................... G06F 12/16; G06F 13/00
(52) U.S. Cl. .................. 714/6; 714/7; 711/114
(58) Field of Search ................. 714/7, 6, 5; 711/114, 711/120

(56) References Cited

U.S. PATENT DOCUMENTS

| | | | | |
|---|---|---|---|---|
| 5,522,065 A | * | 5/1996 | Neufeld | 714/6 |
| 6,018,778 A | * | 1/2000 | Stolowitz | 710/61 |
| 6,154,854 A | * | 11/2000 | Stallmo | 714/6 |
| 6,185,697 B1 | * | 2/2001 | Shiraishi | 714/6 |
| 6,237,052 B1 | * | 5/2001 | Stolowitz | 710/61 |
| 6,256,749 B1 | * | 7/2001 | Kakuta et al. | 714/6 |
| 6,397,347 B1 | * | 5/2002 | Masuyama et al. | 714/6 |
| 6,415,355 B1 | * | 7/2002 | Hirofuji | 711/114 |
| 6,421,760 B1 | * | 7/2002 | McDonald et al. | 711/114 |
| 6,463,505 B2 | * | 10/2002 | Katsuragi et al. | 711/114 |
| 6,480,969 B1 | * | 11/2002 | Hitz et al. | 714/6 |
| 6,523,087 B2 | * | 2/2003 | Busser | 711/114 |
| 6,553,509 B1 | * | 4/2003 | Hanson et al. | 714/5 |
| 6,601,138 B2 | * | 7/2003 | Otterness et al. | 711/114 |

* cited by examiner

*Primary Examiner*—Scott Baderman
*Assistant Examiner*—Anne L. Damiano
(74) *Attorney, Agent, or Firm*—Finnegan, Henderson, Farabow, Garrett & Dunner, L.L.P.

(57) ABSTRACT

When a data update request is sent from a host computer, a main controller determines one of a plurality of disk cache units, which is used, in accordance with a striping group to which a stripe corresponding to the requested update data belongs. The main controller loads the block data, required for generating updated parity data for the stripe in units of blocks, in a parity generator in the corresponding disk cache unit via a cache memory in the determined disk cache unit. The corresponding parity generator generates corresponding parity data.

2 Claims, 5 Drawing Sheets

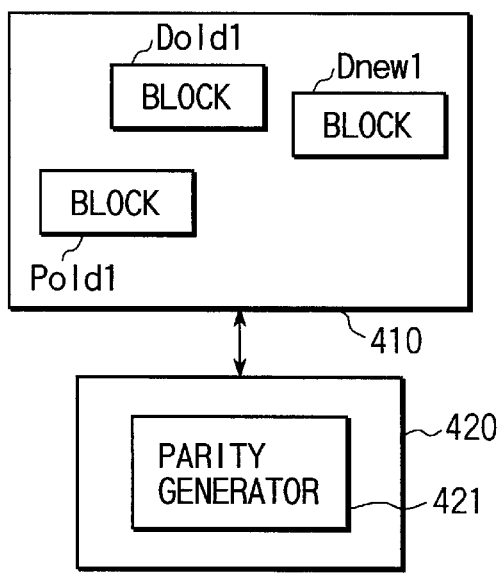
FIG. 3
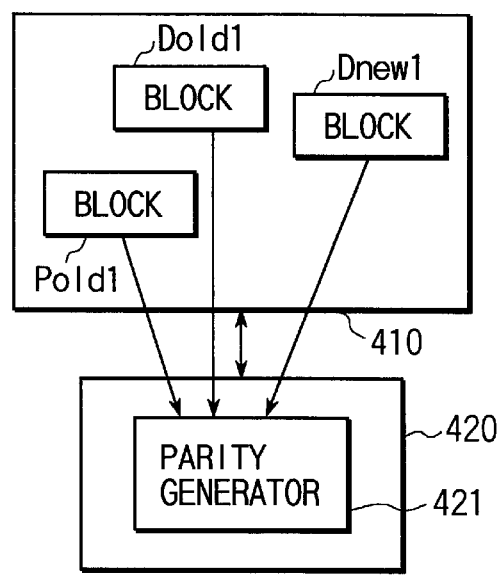
FIG. 4
$$Pnew1 = Dold1 \oplus Pold1 \oplus Dnew1 \quad \sim 421$$
FIG. 5
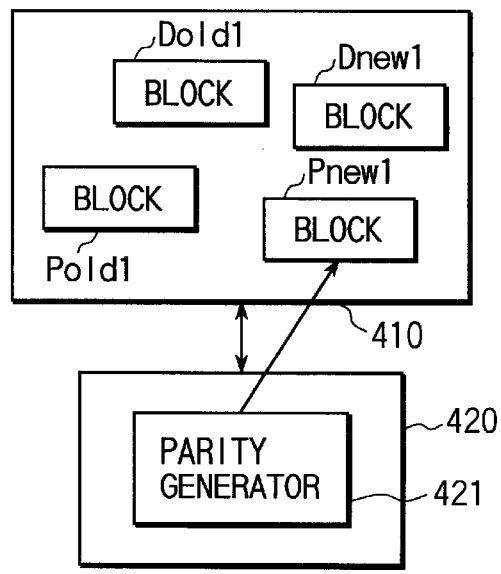
FIG. 6

DISK ARRAY CONTROLLER HAVING DISTRIBUTED PARITY GENERATION FUNCTION

CROSS-REFERENCE TO RELATED APPLICATIONS

This application is based upon and claims the benefit of priority from the prior Japanese Patent Application No. 11-217146, filed Jul. 30, 1999, the entire contents of which are incorporated herein by reference.

BACKGROUND OF THE INVENTION

The present invention relates to a disk array controller for controlling access to a disk array comprised of a plurality of disk drives and, more particularly, to a disk array controller having a distributed parity generation function.

A disk array system known as an external storage system comprising a plurality of disk drives and a disk array controller for controlling access to the disk drives. In this system, to shorten the access period, the disk array controller accesses each disk device in parallel.

The disk array controller generates parity data by exclusive OR operation for reconstructing data from host computer and stored the parity data in a disk drive or disk drives.

When one of the disk devices has failed, the disk controller reconstructs the data on that disk device by exclusive OR operation using the parity data and the data from remaining disk devices.

A RAID (Redundant Arrays of Inexpensive Disks) is known as a data redundancy system using a parity data or the like. The RAID system is characterized in various architectures. Some popular RAID architectures are RAID3 and RAID5.

A RAID3 architecture suitable for sequential access (or a job requiring sequential access) is for transferring a large amount of data. A RAID5 architecture suitable for random access (or a job requiring random access) is for frequently read/write-accessing a small amount of data.

A disk array controller generally includes a cache memory (disk cache) for temporarily storing transfer data between a disk drive and a host computer.

With the above arrangement, when data to be read out is stored in the cache memory, the data can be accessed from this cache memory at high speed without accessing disk drives (accompanying mechanical access operation) regardless of the RAID level such as RAID3 or RAID5.

In the RAID3, update data transferred from the host computer is segmented, and the segmented update data are exclusively ORed to generate an update parity.

In the RAID5, update data transferred from the host computer, data prior to updating and stored in a disk drive area serving as the storage destination of the update data, and parity (parity data) prior to updating and stored in another disk drive area corresponding to the storage destination of the update data are exclusively ORed to generate an update parity.

In a conventional disk array controller, a single dedicated circuit or software (firmware program in the controller) generally generates the update parity described above.

According to this conventional parity generation technique, however, parity data cannot be executed in parallel, and data update processing or data restoration (data reconstruction) processing caused by the failure of a disk drive is time-consuming.

BRIEF SUMMARY OF THE INVENTION

The present invention has been made in consideration of the above situation, and has as its object to provide a disk array controller wherein parity generation is distributed in units of stripes, and parity data are generated by a plurality of parity generators in parallel to allow an increase in speed in data update processing and then data restoration processing caused by the failure of a disk drive.

According to the present invention, there is provided a disk array controller for controlling access to a disk array made up of a plurality of disk drives which store data, transferred from a host computer, to be distributed in units of strips forming stripes, comprising: a plurality of disk cache means arranged in units of striping groups each made up of predetermined stripes, wherein each of the plurality of disk cache means comprises a cache memory for temporarily storing in units of blocks stripes belonging to a corresponding striping group and a parity generator having an exclusive OR operation function of generating parity data for an externally designated stripe in units of blocks; and main controller for determining disk cache memory unique to a striping group to which the stripe serving as a parity generation target belongs, and causing a parity generator in the corresponding disk cache memory to read, via the cache memory in the determined disk cache memory, block data necessary for generating updated parity data for the stripe in units of blocks, thereby generating the corresponding parity data by the corresponding parity generator.

Parity data are generated by cache memories and parity generators (i.e., disk cache means having the parity generators) different in units of striping groups made up of predetermined stripes. The parity data can be generated in parallel for a plurality of stripes.

Letting i be the identification number of the strip as the parity generation target, and N be the number of disk cache means, the disk cache means unique to the striping group represented by a remainder of i/N is used. Assume that the number of stripes serving as the parity generation targets is N. In this case, when the striping groups to which the N stripes belong are different from each other, the parity data for the N stripes can be generated in parallel using different cache disk means.

This arrangement can be applied when one of the plurality of disk drives has failed and the data of the failed disk drive is restored using the data of the remaining disk drives. More specifically, when the disk cache means determined by the striping groups to which the stripes of the disk drives except the failed disk drive belong exclusively OR, in units of blocks (at identical bit positions), the strips (excluding the strips of the failed disk drive) constructing the stripes, the data can be restored in parallel using the plurality of disk cache means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram for explaining parity generation operation when the present invention is applied to a RAID5;

FIG. 4 is a block diagram for explaining parity generation operation when the present invention is applied to the RAID5;

FIG. 5 is a view for explaining exclusive OR operation in parity generation;

FIG. 6 is a block diagram for explaining parity generation operation when the present invention is applied to the RAID5;

DETAILED DESCRIPTION OF THE INVENTION

A preferred embodiment of the present invention will be described below with reference to the accompanying drawing.

Figure 1:
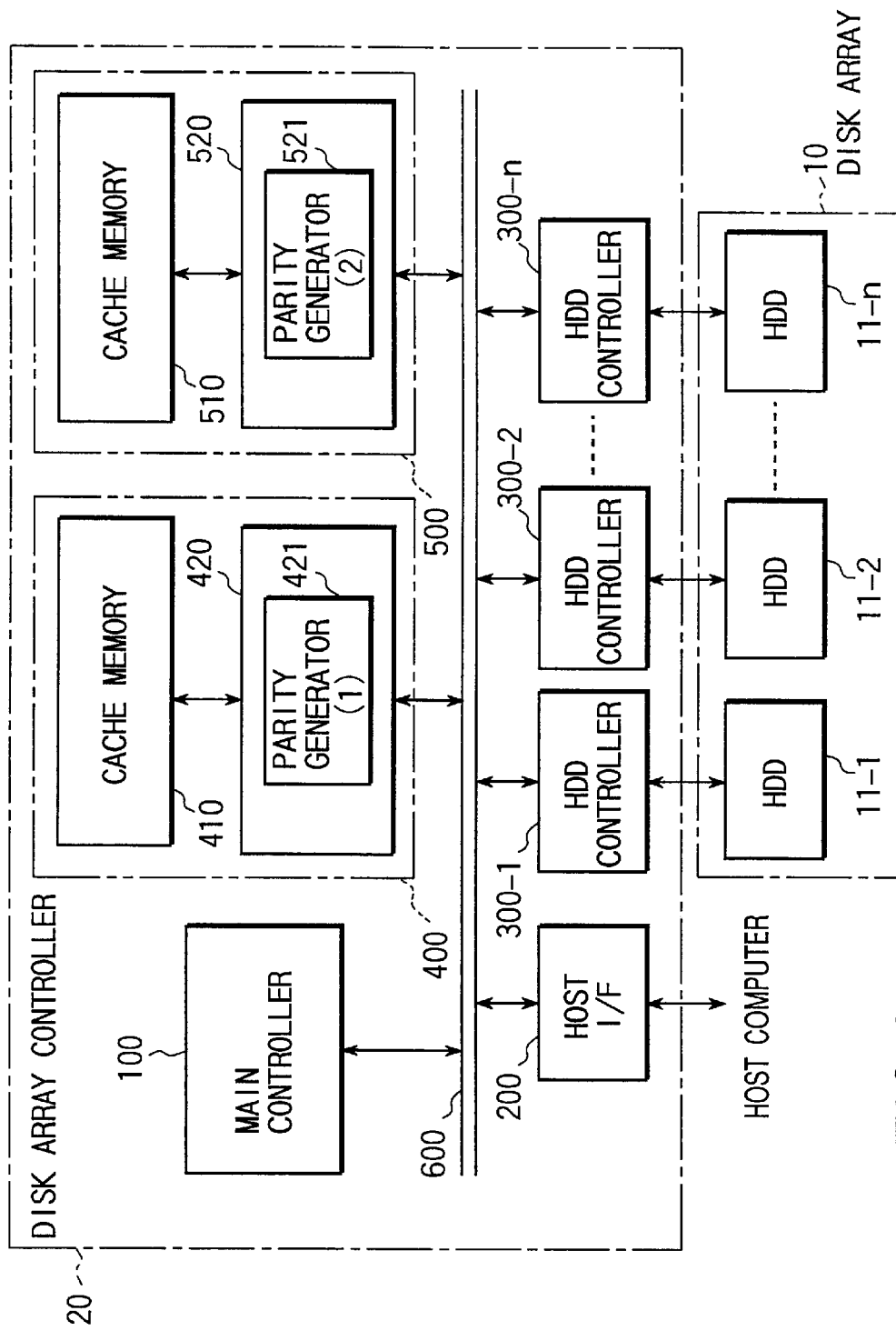
FIG. 1 is a block diagram showing the arrangement of a disk array apparatus having a disk array controller according to an embodiment of the present invention.

FIG. 1 is a block diagram showing the arrangement of a disk array apparatus having a disk array controller according to an embodiment of the present invention.

The disk array apparatus shown in FIG. 1 is comprised of a plurality of (n) disk drives (to be referred to as HDDs hereinafter) 11-1 to 11-n forming a disk array 10, and a disk array controller 20 for controlling access to the HDDs 11-1 to 11-n.

When the disk array apparatus is used as a RAID3, the (n−1) HDDs of the HDDs 11-1 to 11-n are used for data storage (data disk), while one remaining HDD is used for storage of parity data serving as data correction information (parity disk).

When the disk array apparatus is used as a RAID5, All the HDDs 11-1 to 11-n are used for storage of data and parities (parity data) (data and parity storage). This embodiment assumes that the disk array apparatus is used as the RAID5.

An HDD (so-called hot spare disk) allocated as a backup disk and its controller (HDD controller) used when any one of the HDDs 11-1 to 11-n has failed are not illustrated in FIG. 1.

The disk array controller 20 is comprised of a main controller 100 incorporating an MPU (Micro Processing Unit) to control the controller 20 as a whole, a host I/F (interface) 200 serving as an interface controller with a host computer (host computer) (not shown) to control data transfer to the host computer, HDD controllers 300-1 to 300-n for controlling access to the HDDs 11-1 to 11-n and data transfer between an internal bus 600 (to be described below) and the HDDs 11-1 to 11-n, and a plurality of disk cache units, i.e., two disk cache units 400 and 500.

The modules (main controller 100, host I/F 200, HDD controllers 300-1 to 300-n, and disk cache units 400 and 500) in the disk array controller 20 are connected via the internal bus 600 represented by a PCI bus (Peripheral Component Interconnect Bus) known as the standard bus.

The disk cache units 400 and 500 directly pertain to the present invention and are comprised of cache memories 410 and 510 comprised of, e.g., DRAMs for temporarily storing transfer data to the host computer in units of blocks each having a predetermined size, and cache controllers 420 and 520.

The cache controllers 420 and 520 have the parity generation function (using exclusive OR operation), the function of managing the directories of the cache memories 410 and 510, and the function of accessing the cache memories 410 and 510. The cache controllers 420 and 520 incorporate parity generators 421 and 521 comprised of identical exclusive OR circuits (EX-OR circuits).

Figure 8:
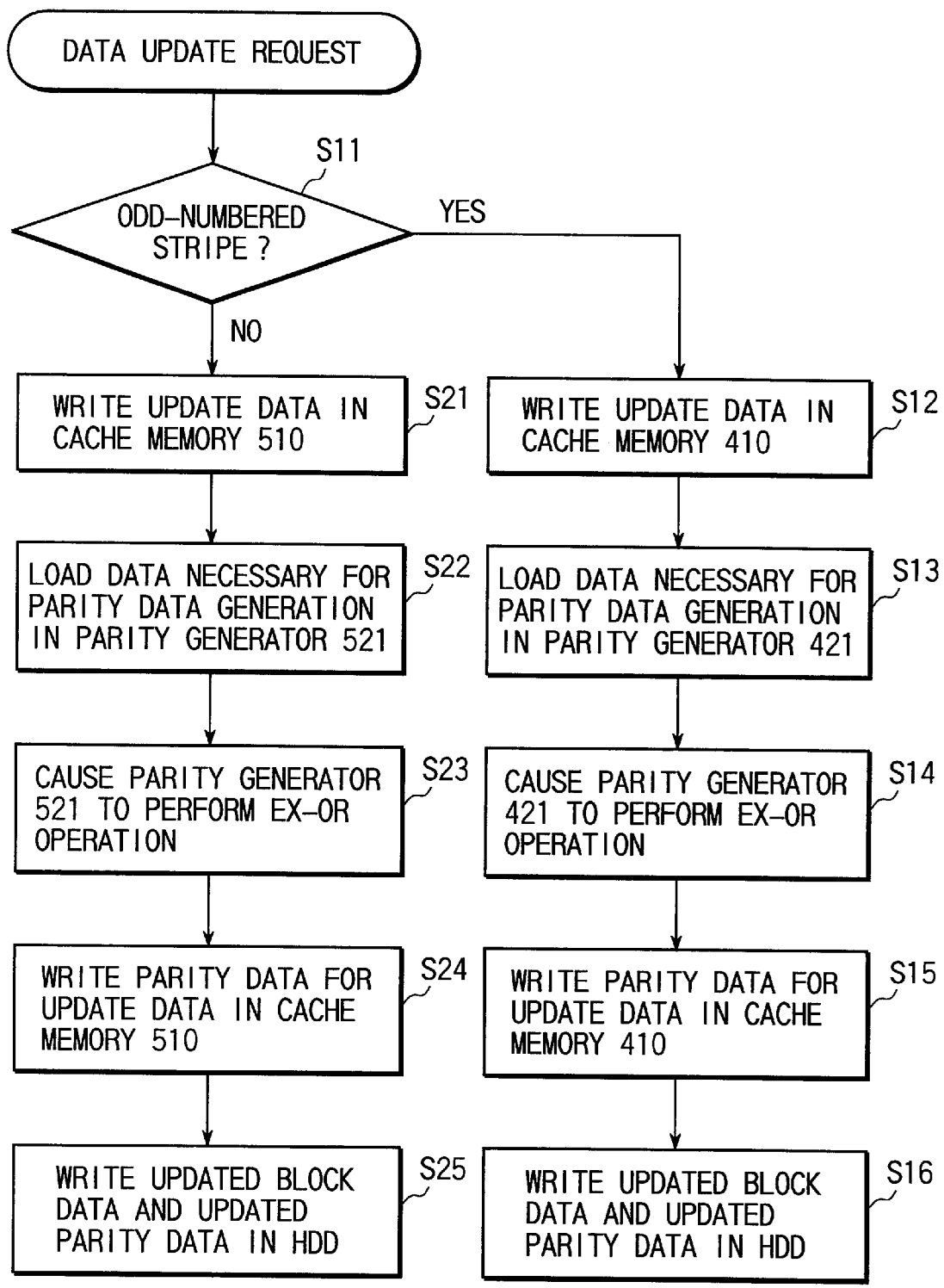
FIG. 8 is a flow chart for explaining operation of the disk array controller of this embodiment.

The operation of the arrangement shown in FIG. 1 will be described with reference to FIGS. 2 and 3 and the flow chart of FIG. 8 when the present invention is applied to the RAID5 to generate parity data.

According to the characteristic feature of this embodiment, two identical parity generators 421 and 521 are arranged to generate parity data, in parallel, in units of stripes. A stripe is a group of units (to be referred to as strips hereinafter) obtained by segmenting data (write data or update data) from the host computer. The stripe contains a strip of the parity data.

Figure 2:
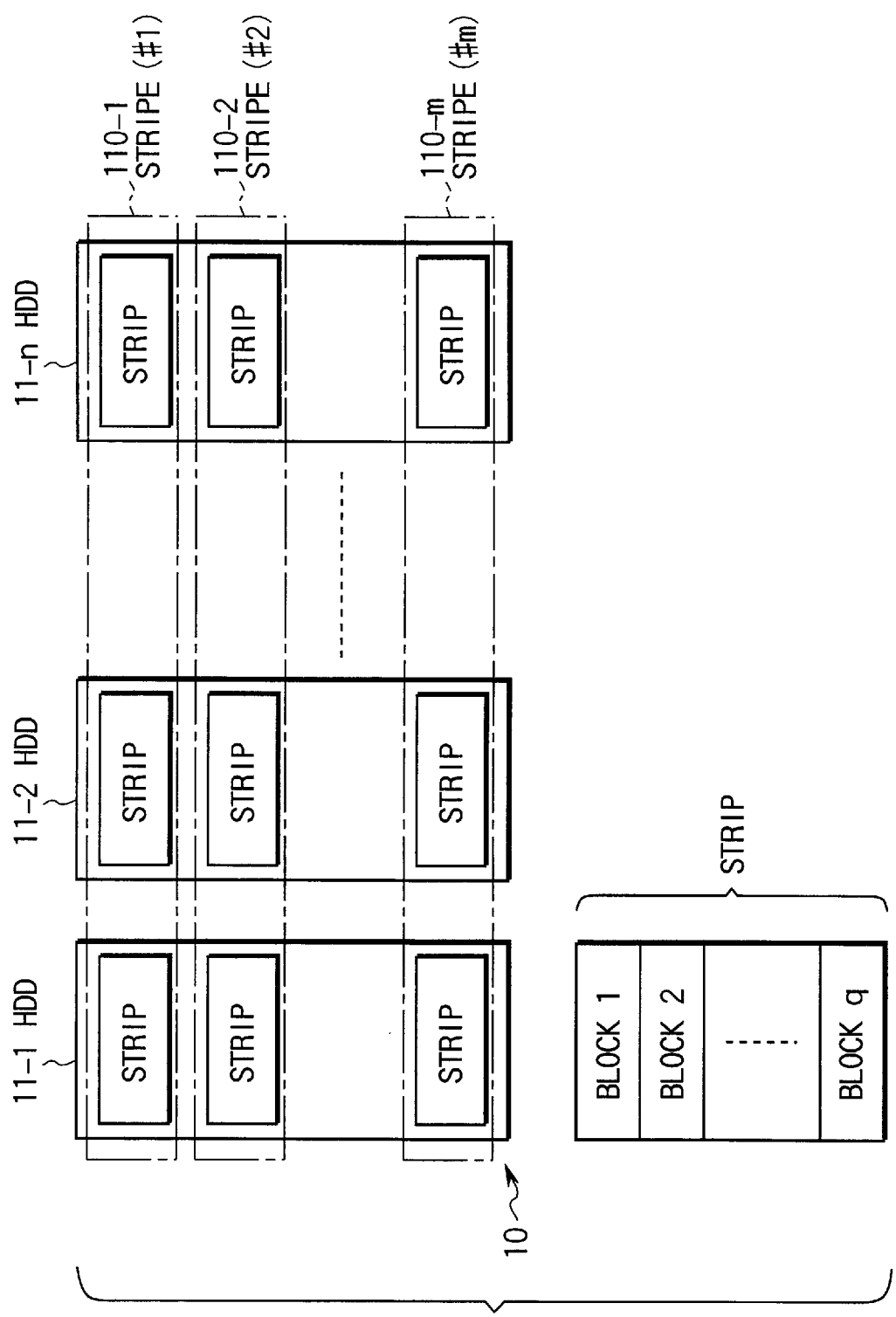
FIG. 2 is a view for explaining the relationship between the stripes and the strips and the relationship between the strips and blocks.

FIG. 2 shows the relationship between the stripe and the strip and the relationship between the strip and the block. The disk array 10 stores m stripes 110-1, 110-2, . . . , 110-m.

The stripe 110-k (k=1 to m) is a group of n strips. The n strips forming the stripe 110-k are distributed and stored in the HDDs 11-1 to 11-n of the disk array 10.

One of the n strips serves as parity data, which coincides with the exclusive OR result of the remaining (n−1) strips (corresponding bits).

In this case, k is called an identification number (stripe number) of the stripe 110-k.

Each strip forming the stripe 110-k is segmented into q blocks and managed on the disk cache memories 410 and 510, as shown in FIG. 2.

The size of one strip is 64 KB (kilobytes), and the size of one block is 4 KB (for the RAID5). In this case, the q value represents 16.

In this embodiment, a group of stripes whose k values (stripe numbers) are odd numbers is called an odd-numbered striping group, while a group of stripes whose k values are even numbers is called an even-numbered striping group.

In this embodiment, odd-numbered stripes (i.e., the stripes belonging to the odd-numbered striping group) such as the stripe 110-1 are held and managed by the cache memory 410.

Even-numbered stripes (i.e., stripes belong to the even-numbered striping group) such as the stripe 110-2 are held and managed by the cache memory 510.

The stripes 110-k are held and managed by different cache memories depending on the type of striping group (in this case, two, odd- and even-numbered striping groups) to which the stripe 110-k belongs, i.e., depending on whether the stripe belongs to the odd- or even-numbered striping group.

Assume that the host computer sends a data update request for the HDD 11-i (i=1 to n) to the host I/F 200 in the disk array controller 20. The main controller 100 in the disk array controller 20 determines whether that the stripe 110-k corresponding to the update data (write data) requested from the host computer is the odd- or even-numbered stripe (S11).

Assume that the update data belongs to an odd-numbered stripe such as the stripe 110-1. In this case, the host I/F 200 causes the cache controller 420 in the main controller 100 to write the update data from the host computer in an arbitrary block area in the cache memory 410 (S12).

The size of update data is less than the one-block length, data Dold1 of the corresponding block before updating (block data before updating) is read out from the cache memory 410 (for cache hit) to generate new block data (updated block data). Dnew1 obtained by rewriting the corresponding block data with the update data. The new block data Dnew1 is stored in a block area different from the arbitrary block data of the block data Dold1.

When the data of the corresponding block is not present on the cache memory 410, i.e., when a cache miss occurs, the HDD controller 300-i reads out the data of the corresponding block, which is stored in the HDD 11-i, from the ith strip on the stripe 110-1. The readout data is written in an arbitrary block area of the cache memory 410 as the block data Dold1 before updating.

Assume that the block data Dold1 before updating and the updated block data Dnew1 are present in the cache memory 410, as shown in FIG. 3. Assume also that parity data (parity data before updating) Pold1 of the stripe 110-1 corresponding to the block data Dold1 before updating is present in the cache memory 410.

When the parity data Pold1 before updating is not present on the cache memory 410, the data Pold1 is loaded from the corresponding position (jth strip in this case) of the stripe 11-1 to the cache memory 410.

When the cache controller 420 detects that the block data Dold1 before updating, the parity data Pold1 before updating, and the updated block data Dnew1 are present on the cache memory 410, the controller 420 loads them to the parity generator 421, as shown in FIG. 4 (S13).

As shown in FIG. 5, the cache controller 420 causes the parity generator 421 to exclusively OR the identical bits of the block data Dold1, parity data Pold1, and block data Dnew1 (S14).

The cache controller 420 stores the exclusive OR result of the parity generator 421 as updated parity data Pnew1 in an arbitrary block area of the cache memory 410, as shown in FIG. 6 (S15).

At this stage, the block data Dold1 and parity data Pold1 on the cache memory 410 are unnecessary and deleted.

In the next updating of the corresponding block, the updated block data Dnew1 and the updated parity data Pnew1 are used as block data Dold1 before updating and parity data Pold1 before updating, respectively.

When the updated parity data Pnew1 is stored in the cache memory 410, the updated parity data Pnew1 and the updated block data Dnew1 already stored in the cache memory 410 serve as delay write targets to the corresponding HDDs of the HDDs 11-1 to 11-n (S16).

The HDD controller 300-j (j is one of 1 to n except i) stores updated parity data Pnew1 at the storage position (the corresponding block position in the jth strip of the stripe 110-1) of the parity data Pold1 before updating on the corresponding HDD 11-j.

Similarly, the HDD controller 300-i stores the updated block data Dnew1 at the storage position (the corresponding block position of the ith strip of the stripe 110-1) of the block data Dold before updating on the corresponding HDD 11-i.

Assume a request for updating data contained in an even-numbered stripe such as the stripe 110-2 is sent from the host computer during the above parity generation (i.e., generation of the updated parity data Pnew1).

In this case, the parity data is generated using the disk cache unit 500 in parallel with generation (upon reception of the request for updating the data contained in the stripe 110-1) of the parity data by the disk cache unit 400 in the same manner as in the parity generation in the disk cache unit 400 under the control of the main controller 100 (S21 to S25).

As described above, according to this embodiment, the two disk cache units 400 and 500 are arranged. The parity generator 421 in the disk cache unit 400 generates parity data upon reception of a request for updating data contained in an odd-numbered stripe. The parity generator 521 in the disk cache unit 500 generates parity data upon reception of a request for updating data contained in an even-numbered stripe. Even if the request for updating data contained in the stripe 110-2 is given while the parity data is generated upon reception of the request for updating data contained in the stripe 110-1, the parity data can be generated upon reception of the request for updating data contained in the stripe 110-2 without waiting for the end of current parity generation.

Parity generation of the disk array apparatus as the RAID5 has been described above. Parity generation of the disk array apparatus as a RAID3 can similarly be performed.

In parity generation of the RAID3, only update data transferred from the host computer is used. The update data is segmented into strips, and parity data are generated between blocks located at identical positions of strips forming identical stripes.

In the arrangement of FIG. 1, the present invention is also applicable to restoration (data reconstruction processing) for restoring the contents of a failed HDD of the HDDs 11-1 to 11-n in a backup disk (hot spare disk) in addition to the parity (updated parity) generation upon reception of a data update request (write request) from the host.

In this case, the stripes of the (n−1) HDDs except the failed HDD of all the HDDs 11-1 to 11-n are used. The parity generator 421 in the disk cache unit 400 performs exclusive OR operation between odd-numbered stripes in units of blocks (identical bit positions). The parity generator 521 in the disk cache unit 500 performs exclusive OR operation between even-numbered stripes in units of blocks (identical bit positions). The exclusive OR results serve as the restored block data.

Figure 7:
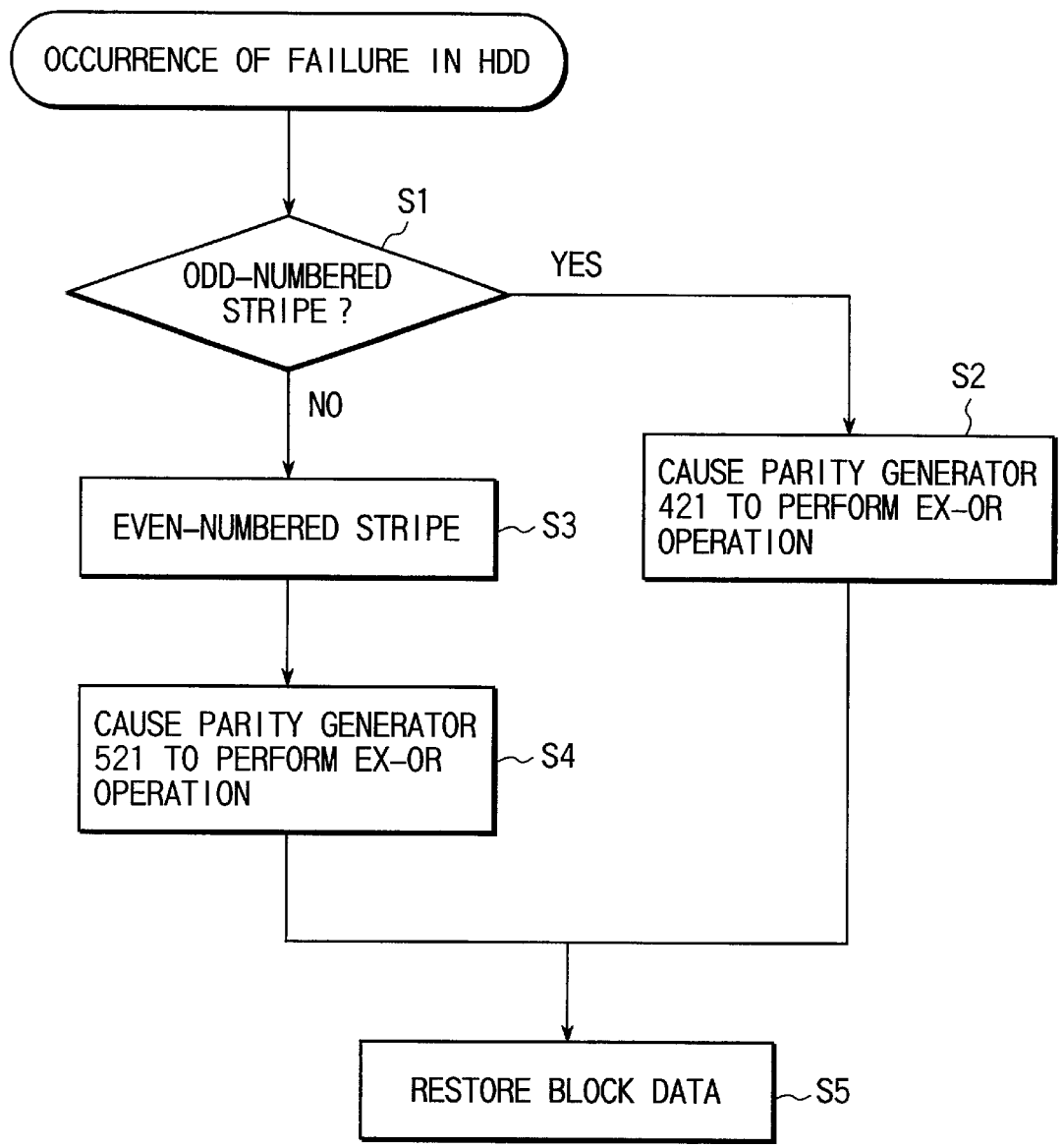
FIG. 7 is a flow chart for explaining a method of restoring corresponding strip data on a failed disk drive.

As shown in the flow chart of FIG. 7, when a failure occurs in one of the HDDs 11-1 to 11-n, the parity generator 421 performs exclusive OR operation between odd-numbered stripes of the (n−1) HDDs except the failed HDD in the HDDs 11-1 to 11-n in units of blocks (identical bit positions), thereby restoring the block data (S1, S2, and S5).

The parity generator 521 performs exclusive OR operation between even-numbered stripes of the (n−1) HDDs except the failed HDD in the HDDs 11-1 to 11-n in units of blocks (identical bit positions), thereby restoring the block data (S1, S3, S4, and S5).

In the above description, when the block data before updating is present on the cache memory 410 (for cache hit), the updated block data is stored in a block area different from the block data before updating on the cache memory 410. However, the present invention is not limited to this. For example, the updated block data may be written on the block data before updating on the cache memory 410.

In this case, the block data before updating must be read out beforehand on the parity generator 421 side (for this purpose, a means for holding block data before updating is required on the parity generator 421 side). Alternatively, the block data before updating must be loaded in the cache memory 410 from the disk array 10 side.

The number of disk cache units (each incorporating the cache memory and parity generator) is not limited to two, but may be three or more.

In this case, letting N be the number of disk cache units and i be the identification number (stripe number) of the stripe corresponding to the update data, the disk cache unit to be used is determined in accordance with a striping group represented by a remainder of i/N, i.e., an i mod N value (i.e., a value of modulo N for i). This scheme also applies to the case for N=2.

As has been described above, according to the present invention, parity generation (exclusive OR operations) is distributed in units of stripes serving as parity generation targets. A plurality of parity generators generate parity data in parallel (exclusive OR operations). Data update processing and then data restoration processing upon occurrence of a failure in a disk drive can be performed at high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk array controller for controlling access to a disk array made up of a plurality of disk drives which store data, transferred from a host computer, to be distributed in units of strips forming stripes, comprising:

a plurality of disk cache means arranged in units of striping groups each made up of predetermined stripes, wherein each of said plurality of disk cache means comprises a cache memory for temporarily storing in units of blocks stripes belonging to a corresponding striping group and a parity generator having an exclusive OR operation function of generating parity data for an externally designated stripe in units of blocks; and a main controller for determining a disk cache means unique to a striping group to which the stripe serving as a parity generation target belongs, and causing a parity generator in the corresponding disk cache means to read, via the cache memory in said determined disk cache means, block data necessary for generating updated parity data for the stripe in units of blocks, thereby generating a corresponding parity data by the parity data in said corresponding parity generator, wherein letting i be an identification number of the stripe as the parity generation target, and N be the number of disk cache means, said disk cache memories unique to the striping group represented by a remainder of i/N is used in parity data generation.

2. A controller according to claim 1, wherein when a failure occurs in one of the plurality of disk drives, said main controller causes the parity generators in said disk cache means determined by the striping groups to which stripes of remaining disk drives except for a failed disk drive to perform exclusive OR operation between the strips forming the stripes except the strips on the failed disk drive, in units of blocks, restoring the data of the corresponding strips on the failed disk drive in units of blocks.

* * * * *